United States Patent
Nam et al.

(10) Patent No.: US 9,929,450 B2
(45) Date of Patent: Mar. 27, 2018

(54) POUCH-TYPE SECONDARY BATTERY AND SECONDARY BATTERY MODULE COMPRISING THE SAME

(71) Applicant: LG CHEM, LTD., Seoul (KR)

(72) Inventors: Jin-Moo Nam, Daejeon (KR); Jun-Yeob Seong, Daejeon (KR); Dal-Mo Kang, Daejeon (KR); Seung-Hun Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 199 days.

(21) Appl. No.: 14/780,301

(22) PCT Filed: Oct. 15, 2014

(86) PCT No.: PCT/KR2014/009677
§ 371 (c)(1),
(2) Date: Sep. 25, 2015

(87) PCT Pub. No.: WO2015/056973
PCT Pub. Date: Apr. 23, 2015

(65) Prior Publication Data
US 2016/0056515 A1     Feb. 25, 2016

(30) Foreign Application Priority Data

Oct. 15, 2013 (KR) .................. 10-2013-0122761

(51) Int. Cl.
*H01M 10/655* (2014.01)
*H01M 10/6554* (2014.01)
(Continued)

(52) U.S. Cl.
CPC ....... *H01M 10/6554* (2015.04); *H01M 2/021* (2013.01); *H01M 2/08* (2013.01);
(Continued)

(58) Field of Classification Search
CPC ........... H01M 10/6554; H01M 10/613; H01M 10/647; H01M 10/6551; H01M 2/021
See application file for complete search history.

(56) References Cited

U.S. PATENT DOCUMENTS

| 2004/0016455 A1 | 1/2004 | Oogami |
| 2004/0036444 A1 | 2/2004 | Oogami |

(Continued)

FOREIGN PATENT DOCUMENTS

| JP | 2004-063278 A | 2/2004 |
| KR | 10-2007-0056489 A | 6/2007 |

(Continued)

OTHER PUBLICATIONS

International Search Report issued in PCT/KR2014/009677 dated Jan. 30, 2015.

(Continued)

*Primary Examiner* — Jonathan G Jelsma
(74) *Attorney, Agent, or Firm* — Birch, Stewart, Kolasch & Birch, LLP (57) ABSTRACT

A secondary battery module according to the present disclosure includes a pouch-type secondary battery including an electrode assembly in which a cathode plate and an anode plate are stacked with a separator interposed between the cathode plate and the anode plate, an electrode tab extending from the electrode assembly, and a pouch case to receive the electrode assembly, including an upper pouch and a lower pouch, and having a coupling hole formed at an outer peripheral area passing through in a vertical direction, and a cooling pin coupled with the pouch-type secondary battery by the coupling hole. According to the present disclosure, there is an effect of fixing a plurality of pouch-type secondary batteries to the cooling pin without a cartridge for holding the pouch-type secondary batteries.

9 Claims, 5 Drawing Sheets

(51) Int. Cl.
*H01M 2/02* (2006.01)
*H01M 10/647* (2014.01)
*H01M 10/6551* (2014.01)
*H01M 10/613* (2014.01)
*H01M 10/623* (2014.01)
*H01M 2/08* (2006.01)

(52) U.S. Cl.
CPC ....... *H01M 10/613* (2015.04); *H01M 10/623* (2015.04); *H01M 10/647* (2015.04); *H01M 10/6551* (2015.04); *H01M 2220/30* (2013.01)

(56) References Cited

U.S. PATENT DOCUMENTS

| | | | |
|---|---|---|---|
| 2005/0089751 A1* | 4/2005 | Oogami | H01M 2/1061 429/162 |
| 2007/0141460 A1 | 6/2007 | You et al. | |
| 2008/0090137 A1* | 4/2008 | Buck | H01M 2/1077 429/120 |
| 2012/0189909 A1 | 7/2012 | Hohenthanner et al. | |
| 2012/0202109 A1 | 8/2012 | Seo et al. | |
| 2013/0045410 A1 | 2/2013 | Yang et al. | |
| 2015/0037649 A1* | 2/2015 | Wyatt | H01M 10/625 429/120 |

FOREIGN PATENT DOCUMENTS

| | | |
|---|---|---|
| KR | 10-2011-0112716 A | 10/2011 |
| KR | 10-2011-0126764 A | 11/2011 |
| KR | 10-2012-0090828 A | 8/2012 |
| KR | 10-2012-0126208 A | 11/2012 |

OTHER PUBLICATIONS

Written Opinion of the International Searching Authority issued in PCT/KR2014/009677 dated Jan. 30, 2015.

* cited by examiner

POUCH-TYPE SECONDARY BATTERY AND SECONDARY BATTERY MODULE COMPRISING THE SAME

TECHNICAL FIELD

The present disclosure relates to a pouch-type secondary battery and a secondary battery module comprising the same, and more particularly, to a secondary battery module for fixing a plurality of pouch-type secondary batteries to a cooling pin without a cartridge for holding the pouch-type secondary batteries.

The present application claims priority to Korean Patent Application No. 10-2013-0122761 filed in the Republic of Korea on Oct. 15, 2013, the disclosures of which are incorporated herein by reference.

BACKGROUND ART

With the technology development and the increasing demand for mobile devices, the demand for batteries as an energy source is dramatically increasing, and in keeping up with this movement, many studies are being made on batteries to meet diverse demands.

Typically, batteries may be classified into a can-type secondary battery and a pouch-type secondary battery based on the case type.

In this instance, a pouch-type secondary battery includes a pouch case, an electrode assembly, and an electrode tab. The pouch case may be formed with a sufficient size to accommodate the electrode assembly, the electrode tab, and an electrode lead to be described below.

The electrode assembly includes a cathode plate, an anode plate, and a separator. The electrode assembly may have the cathode plate and the anode plate stacked in a sequential order with the separator interposed between the cathode plate and the anode plate. The electrode assembly typically includes, for example, a jelly-roll (wound) electrode assembly having a structure in which long sheet-type cathodes and anodes are wound with separators interposed therebetween, a stack-type electrode assembly having a structure in which a plurality of cathodes and anodes cut to a predetermined size are stacked in a sequential order with separators interposed therebetween, and a stack/folding-type electrode assembly having a structure in which bicells or full cells including a predetermined unit of cathodes and anodes stacked with separators interposed therebetween are folded.

The electrode tab extends from the electrode assembly. In this instance, the electrode tab may be connected to other component such as the electrode lead (not shown) while not being directly exposed to the outside of the pouch case.

The pouch-type secondary battery may be used singularly, but to increase the capacity or power, is often used by electrically connecting a plurality of pouch-type secondary batteries.

Here, the plurality of pouch-type secondary batteries constructs a secondary battery module. Thus, heat generated from each secondary battery is aggregated, and due to a dense structure of the secondary batteries, a large amount of heat is produced, and to discharge the heat, an additional structure such as a cooling pin may be included.

Also, a cartridge may be provided to fix each pouch-type secondary battery to the cooling pin in the secondary battery module.

However, in the case of this coupling structure, the size of the secondary battery module may increase, and the use of the cartridge causes a problem with an increasing number of components for coupling and a complex assembly process.

DISCLOSURE

Technical Problem

The present disclosure is designed to solve the above problem, and therefore, the present disclosure is to providing a pouch-type secondary battery that allows a plurality of pouch-type secondary batteries to be fixed to a cooling pin without a cartridge for holding the pouch-type secondary batteries, and a secondary battery module comprising the same.

Technical Solution

To achieve the above object, a pouch-type secondary battery according to the present disclosure includes an electrode assembly in which a cathode plate and an anode plate are stacked with a separator interposed between the cathode plate and the anode plate, an electrode tab extending from the electrode assembly, and a pouch case to receive the electrode assembly, including an upper pouch and a lower pouch, and having a coupling hole formed at an outer peripheral area passing through in a vertical direction.

Preferably, the pouch case may include a sealing part where the upper pouch and the lower pouch are sealed, and may further include an extension part formed outside the sealing part, and the coupling hole may be formed in the extension part.

Also, preferably, the coupling hole may be formed at a corner of the pouch case.

Also, preferably, the pouch case may have at least two coupling holes.

Also, preferably, the coupling hole may have a reinforcing member therein to surround an inner side of the coupling hole.

Also, preferably, the reinforcing member may be made of a material having insulating properties.

To achieve the above object, a secondary battery module according to the present disclosure includes a pouch-type secondary battery including an electrode assembly in which a cathode plate and an anode plate are stacked with a separator interposed between the cathode plate and the anode plate, an electrode tab extending from the electrode assembly, and a pouch case to receive the electrode assembly, including an upper pouch and a lower pouch, and having a coupling hole formed at an outer peripheral area passing through in a vertical direction, and a cooling pin coupled with the pouch-type secondary battery by the coupling hole.

Preferably, the pouch case may include a sealing part where the upper pouch and the lower pouch are sealed, and may further includes an extension part formed outside the sealing part, and the coupling hole may be formed in the extension part.

Also, preferably, the coupling hole may be formed at a corner of the pouch case.

Also, preferably, the pouch case may have at least two coupling holes.

Also, preferably, the coupling hole may have a reinforcing member therein to surround an inner side of the coupling hole.

Also, preferably, the reinforcing member may be made of a material having insulating properties.

Also, preferably, the pouch-type secondary battery may be coupled to the cooling pin by inserting a bolt into the coupling hole.

Also, preferably, a washer may be interposed between the coupling hole and the cooling pin.

Advantageous Effects

A pouch-type secondary battery according to the present disclosure has a coupling hole in a pouch case, thereby coupling a plurality of pouch-type secondary batteries to a cooling pin without an additional cartridge.

Thus, a pouch-type secondary battery module according to another aspect of the present disclosure including the pouch-type secondary battery with the coupling hole may provide assembly process simplification and a manufacturing cost reduction.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
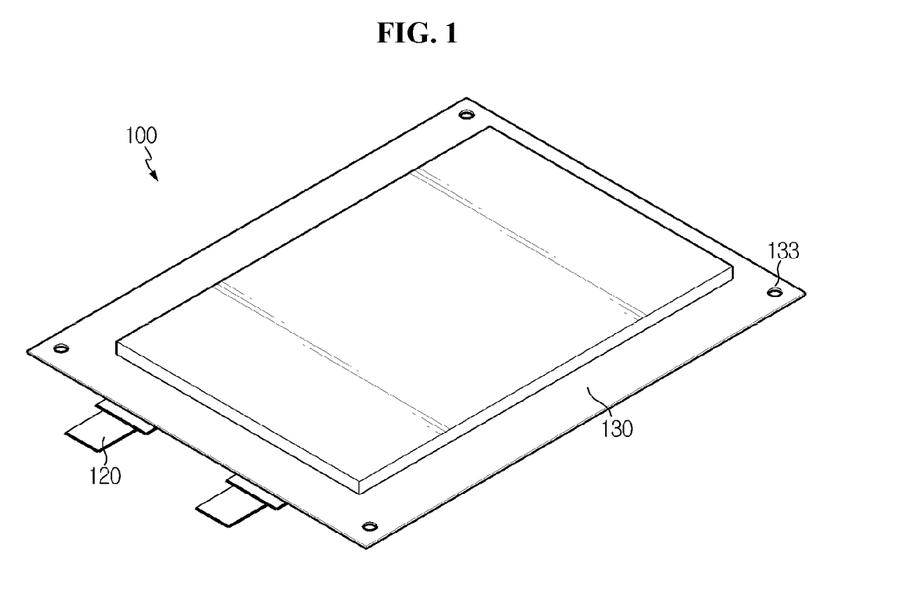
FIG. 1 is a perspective view of a pouch-type secondary battery according to the present disclosure.
Figure 2:
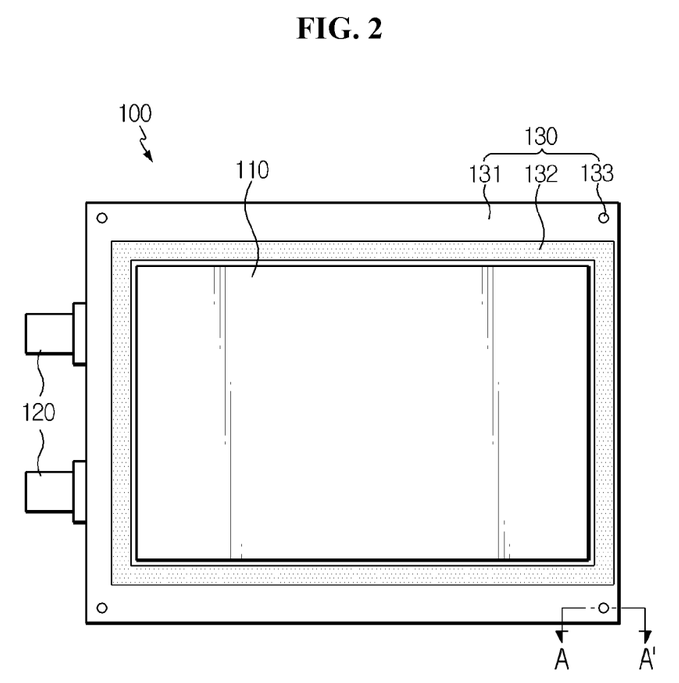
FIG. 2 is a cross-sectional view illustrating a pouch-type secondary battery according to an exemplary embodiment of the present disclosure.

FIG. 1 is a perspective view of a pouch-type secondary battery according to the present disclosure. FIG. 2 is a cross-sectional view illustrating the pouch-type secondary battery according to an exemplary embodiment of the present disclosure.

Referring to FIGS. 1 and 2, the pouch-type secondary battery 100 according to the present disclosure includes an electrode assembly 110, an electrode tab 120, and a pouch case 130.

The electrode assembly 110 has the cathode plate and the anode plate stacked with the separator interposed therebetween, and the cathode plate and the anode plate are electrically isolated from each other.

The cathode plate includes a cathode current collector made of a metal thin plate with high conductivity, for example, an aluminum (Al) foil, and a cathode active material layer coated on both surfaces of the cathode current collector. The cathode plate may have an area of the cathode current collector where the cathode active material layer is not formed on the both sides, i.e., a cathode coating-free part. At one end of the cathode coating-free part, the cathode plate may be joined with a cathode tab made of a metal, for example, aluminum (Al).

The anode plate includes an anode current collector made of a conductive metal thin plate, for example, a copper (Cu) foil, and an anode active material layer coated on both surfaces of the anode current collector. The anode plate may have an area of the anode current collector where the anode active material layer is not formed on the both sides, i.e., an anode coating-free part. At one end of the anode coating-free part, the anode plate may be joined with an anode tab made of a metal, for example, nickel (Ni).

The separator is disposed between the cathode plate and the anode plate to electrically isolate the cathode plate from the anode plate, and may be formed of a porous membrane between the cathode plate and the anode plate to allow lithium ions to pass therethrough. The separator may be made of a porous membrane using, for example, polyethylene (PE), polypropylene (PP), or a composite film thereof.

The electrode tab 120 extends from the electrode assembly 110. Both a cathode tab and an anode tab may extend from one side of the electrode assembly 110 as shown in FIGS. 1 and 2, and although not shown, the cathode tab and the anode tab may extend from both sides of the electrode assembly 110, respectively.

Also, for an electrical connection to an external terminal or device, the electrode tab 120 may be coupled to the electrode assembly 110 such that a portion of the electrode tab 120 is exposed to the outside of the pouch case 130, or the electrode tab 120 may be connected to other component such as the electrode lead (not shown). In this instance, an adhesive film (not shown) may be additionally used for easy adhesion of the electrode tab 120 and the pouch case 130.

The pouch case 130 may include an upper pouch and a lower pouch. Also, the pouch case 130 has an empty space inside where the electrode assembly may be received in the internal space. In this instance, the pouch case 130 has a sealing part at which the upper pouch and the lower pouch are sealed, and after the electrode assembly 110, the electrode tab 120, and an electrolyte solution (not shown) are received, the sealing parts 131 of the upper pouch and the lower pouch may be adhered to each other.

According to the present disclosure, the pouch case 130 may have an extension part 132 outside the sealing part 131, and a coupling hole 133 may be formed in the extension part 132. The coupling hole 133 may be formed passing through in the vertical direction in an outside area of the pouch case 130, i.e., a peripheral area of the receiving space of the electrode assembly 110. In this instance, the location of the coupling hole 133 is not necessarily limited to the exemplary location, and the coupling hole 133 may be formed at various locations where a plurality of pouch-type secondary batteries 100 may be fixed to a cooling pin 210. According to this embodiment, without a separate cartridge for holding, the plurality of secondary batteries 100 may be fixed to the cooling pin 210 with increased coupling strength, and an assembly process may be simplified.

For example, as shown in FIGS. 1 and 2, the coupling hole 133 may be formed outside the sealing part 131, to be exact, at the corner of the long side of the pouch case 130. More specifically, the coupling hole 133 may be disposed at both sides of the electrode tab 120, or at least one coupling hole 133 may be formed at an area corresponding to the electrode tab 120, thereby achieving stronger coupling.

Figure 3:
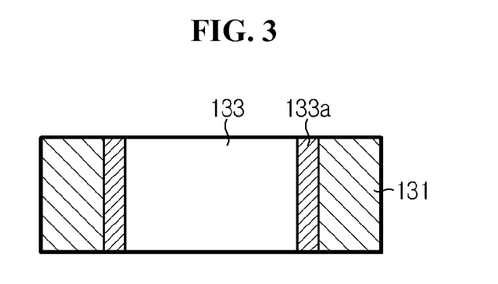
FIG. 3 is an enlarged view of FIG. 2 taken along the line A-A'.

The coupling hole 133 may be integrally formed with the pouch case 130. In this instance, the coupling hole 133 may be formed in an approximately round shape as shown in FIG. 3, but the present disclosure is not limited to a particular shape of the coupling hole 133.

Preferably, at least two coupling holes 133 may be formed in the pouch case 130.

Although FIGS. 1 and 2 show that four coupling holes 133 are formed, the present disclosure is not limited thereto, and various numbers of coupling holes sufficient to couple the plurality of pouch-type secondary batteries 100 may be formed.

Preferably, the coupling hole 133 may have a reinforcing member 133a formed therein to surround the inner side thereof. Its detailed description is provided with reference to FIG. 3.

FIG. 3 is an enlarged view of FIG. 2 taken along the line A-A'.

Referring to FIG. 3, the coupling hole 133 has the reinforcing member 133a, and the reinforcing member 133a may be formed to surround the inner side of the coupling hole 133. According to this embodiment, when bolt-coupling or fit-coupling is made in the coupling hole 133, the reinforcing member 133a may prevent the coupling hole 133 from being torn or damaged due to the external impact or shock. In this instance, the reinforcing member 133a is preferably made of a material with greater rigidity than the coupling hole 133.

Also, the reinforcing member 133a may be made of a material having insulating properties. The pouch case 130 includes a metal layer inside, and when the coupling hole 133 is formed, the metal layer may be exposed to the outside. However, because the reinforcing member 133a is made of a material having insulating properties, even if the metal layer of the pouch case 130 is exposed to the outside at an area where the coupling hole 133 is formed, danger of an internal short circuit of the pouch-type secondary battery 100 may be prevented.

Figure 4:
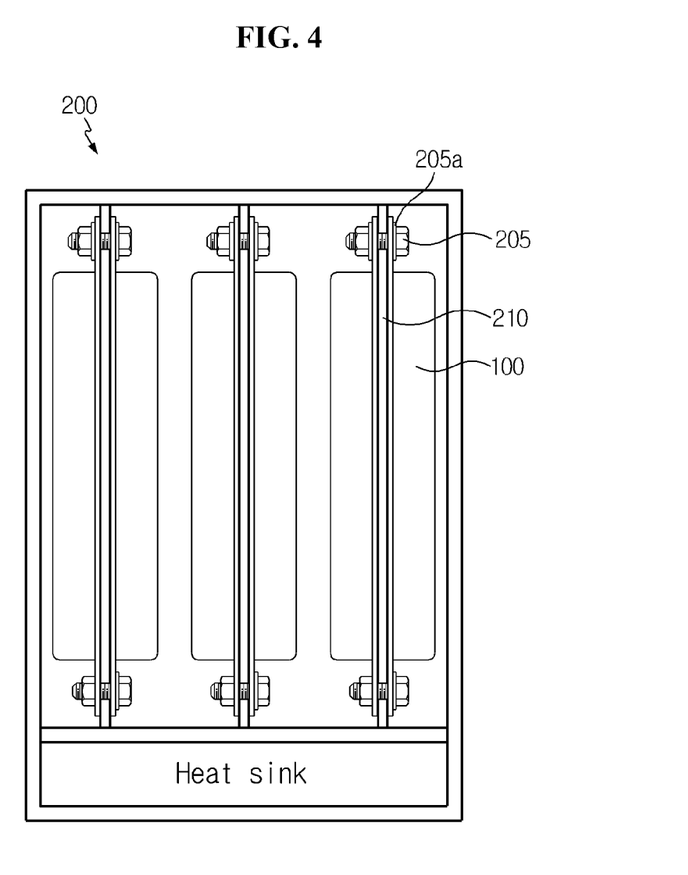
FIG. 4 is a cross-sectional view illustrating a secondary battery module according to the present disclosure.
Figure 5:
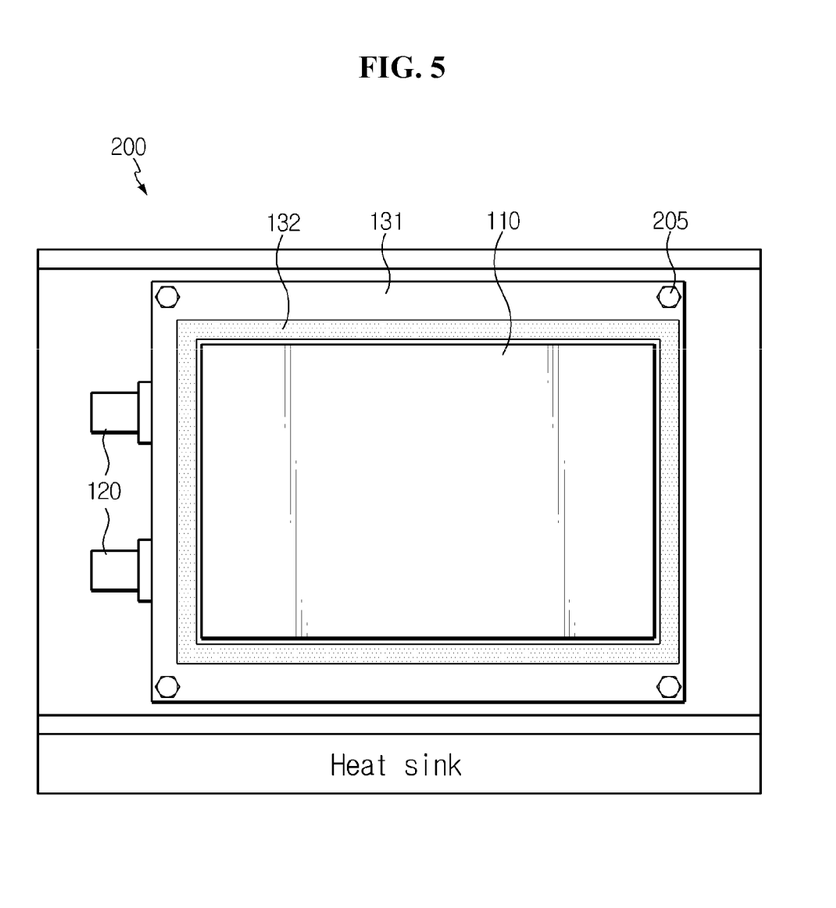
FIG. 5 is a plane view illustrating a secondary battery module according to the present disclosure.

FIG. 4 is a cross-sectional view illustrating a secondary battery module according to the present disclosure. FIG. 5 is a plane view illustrating the secondary battery module according to the present disclosure.

Referring to FIGS. 4 and 5, the secondary battery module 200 includes the pouch-type secondary battery 100 and the cooling pin 210.

The pouch-type secondary battery 100 may be formed in an approximately hexahedral or prismatic shape as shown in FIGS. 1 and 2, and at least two pouch-type secondary batteries 100 may be assembled to form the secondary battery module 200.

At least two coupling holes 133 may be formed in the pouch case 130. For example, in the case where an attempt is made to couple at least two pouch-type secondary batteries 100 to the cooling pin 210, when a plurality of coupling holes 133 is used in the coupling, the coupling strength between the pouch-type secondary batteries 100 and the cooling pin 210 may increase by virtue of the plurality of coupling holes 133.

As the coupling hole 133 is integrally formed with the pouch case 130, the plurality of pouch-type secondary batteries 100 may be fixed to the cooling pin 210 without an additional cartridge. That is, the plurality of pouch-type secondary batteries 100 may be directly attached and fixed to the cooling pin 210 using the coupling hole 133. By this embodiment of the present disclosure, an assembly process may be simplified and the number of components for coupling may reduce.

The pouch-type secondary battery 100 may be coupled to the cooling pin 210 by inserting a bolt 205 into the coupling hole 133. For example, the pouch-type secondary battery 100 may be coupled to the cooling pin 210 by insertion into the coupling hole 133 by bolt-coupling or fit-coupling.

Also, a washer 205a may be interposed between the coupling hole 133 and the cooling pin 210. That is, the washer 205a is interposed between the bolt 205 and the pouch-type secondary battery 100 to distribute the external shock applied to the coupling hole 133 and the cooling pin 210.

In the structure of the cooling pin 210 integrally formed with a heat sink, the secondary battery module 200 of the present disclosure may have a pack case as shown in FIG. 5. Thus, a connection process of the pack case and the heat sink may be eliminated, and consequently, an assembly process may be simplified and a manufacturing cost may reduce.

While the exemplary embodiments of the present disclosure have been described with reference to the accompanying drawings, the present disclosure is not limited to these embodiments and may be modified in a variety of different forms, and it should be understood by those skilled in the art that the present disclosure may be practiced in specific different forms without departing from the technical spirit or essential features of the present disclosure. Therefore, it should be understood that the disclosed embodiments are illustrative, but not limiting, in all aspects.

What is claimed is:

1. A secondary battery module comprising:
   a pouch-type secondary battery comprising:
      an electrode assembly in which a cathode plate and an anode plate are stacked with a separator interposed between the cathode plate and the anode plate;
      an electrode tab extending from the electrode assembly; and
      a pouch case to receive the electrode assembly, including an upper pouch and a lower pouch, and having a coupling hole formed at an outer peripheral area passing through in a vertical direction;
   a heat sink;
   a cooling pin extending from the heat sink and coupled with the pouch-type secondary battery by the coupling hole; and
   a fastener extending through the coupling hole and the cooling pin to couple the cooling pin and the pouch-type secondary battery.

2. The secondary battery module according to claim 1, wherein the pouch case includes a sealing part where the upper pouch and the lower pouch are sealed and further includes an extension part formed outside the sealing part, and the coupling hole is formed in the extension part.

3. The secondary battery module according to claim 1, wherein the coupling hole is formed at a corner of the pouch case.

4. The secondary battery module according to claim 1, wherein the pouch case has at least two coupling holes.

5. The secondary battery module according to claim 4, wherein the two coupling holes are formed along a first edge of the pouch case, and
   wherein the cooling pin extends along the first edge of the pouch case.

6. The secondary battery module according to claim 1, wherein the coupling hole has a reinforcing member therein to surround an inner side of the coupling hole.

7. The secondary battery module according to claim 6, wherein the reinforcing member is made of a material having insulating properties.

8. The secondary battery module according to claim 1, wherein a washer is interposed between the coupling hole and the cooling pin.

9. The secondary battery module according to claim 1, further comprising a housing,
   wherein the cooling pin extends from a first side of the housing to a second side of the housing opposite the first side.

\* \* \* \* \*